US012743322B2

(12) United States Patent
Kurian et al.

(10) Patent No.: US 12,743,322 B2
(45) Date of Patent: Sep. 22, 2026

(54) AUTOMATIC NODE FUNGIBILITY BETWEEN COMPUTE AND INFRASTRUCTURE NODES IN EDGE ZONES

(71) Applicant: Microsoft Technology Licensing, LLC, Redmond, WA (US)

(72) Inventors: Alphonse Kurian, Bellevue, WA (US); Chandrasekhar Pasupuleti, Issaquah, WA (US); Arpan Kumar Asthana, Bothell, WA (US); PushpRaj Agrawal, Jr., Redmond, WA (US); Humayun Mukhtar Khan, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 707 days.

(21) Appl. No.: 18/026,030

(22) PCT Filed: Sep. 10, 2021

(86) PCT No.: PCT/US2021/049947
§ 371 (c)(1),
(2) Date: Mar. 13, 2023

(87) PCT Pub. No.: WO2022/056312
PCT Pub. Date: Mar. 17, 2022

(65) Prior Publication Data

US 2023/0367654 A1 Nov. 16, 2023

(30) Foreign Application Priority Data

Sep. 11, 2020 (NL) ...................................... 2026456

(51) Int. Cl.
*G06F 9/50* (2006.01)
*G06F 9/455* (2018.01)

(52) U.S. Cl.
CPC ........ *G06F 9/5083* (2013.01); *G06F 9/45558* (2013.01); *G06F 2009/4557* (2013.01); *G06F 2009/45595* (2013.01)

(58) Field of Classification Search
CPC ............... G06F 9/5083; G06F 9/45558; G06F 2009/4557; G06F 2009/45595;
(Continued)

(56) References Cited

U.S. PATENT DOCUMENTS 11,212,171 B1 * 12/2021 Ozkan ..................... G06F 9/453
11,743,325 B1 * 8/2023 Dunsmore .............. G06F 9/505
709/203

(Continued)

FOREIGN PATENT DOCUMENTS

JP 2009223517 A 10/2009
JP 2014229253 A 12/2014

OTHER PUBLICATIONS

Communication 94(3) Received for European Application No. 21782852.4, mailed on Nov. 19, 2024, 05 pages.

(Continued)

*Primary Examiner* — Kenneth Tang
(74) *Attorney, Agent, or Firm* — Ray Quinney & Nebeker P.C.; Tiffany B. Healy

(57) ABSTRACT

A cloud-computing system dynamically manages allocation of infrastructure nodes and compute nodes in an edge zone of the cloud-computing system. The edge zone begins with a first number of infrastructure nodes and a second number of compute nodes. As the edge zone executes customer workloads, the cloud-computing system determines whether the infrastructure nodes are over utilized or under utilized. When the infrastructure nodes are under utilized, the cloud-computing system re-assigns an infrastructure node to the compute nodes. When the infrastructure nodes are over (Continued)

utilized, the cloud-computing system re-assigns a compute node to the infrastructure nodes. In this way, the cloud-computing system dynamically maintains an optimal balance between resources devoted to supporting the edge zone (the infrastructure nodes) and resources devoted to executing customer workloads (the compute nodes). In other words, the cloud-computing system continually maximizes use of edge zone resources for executing the customer workloads while maintaining necessary infrastructure.

20 Claims, 7 Drawing Sheets

(58) Field of Classification Search
CPC ......... G06F 9/5072; G06F 2009/45591; G06F 2209/5022
See application file for complete search history.

(56) References Cited

U.S. PATENT DOCUMENTS

| | | | | |
|---|---|---|---|---|
| 2009/0003260 | A1 | 1/2009 | Guo | |
| 2012/0233668 | A1* | 9/2012 | Leafe | G06F 9/44526 726/4 |
| 2013/0247034 | A1* | 9/2013 | Messerli | G06F 9/45533 718/1 |
| 2014/0059226 | A1* | 2/2014 | Messerli | H04L 67/51 709/226 |
| 2014/0325076 | A1* | 10/2014 | Madduri | H04L 47/76 709/226 |
| 2015/0135185 | A1* | 5/2015 | Sirota | H04L 67/10 718/103 |
| 2016/0072727 | A1* | 3/2016 | Leafe | H04L 47/781 709/226 |
| 2016/0323374 | A1* | 11/2016 | Russinovich | G06F 9/5061 |
| 2018/0365108 | A1* | 12/2018 | Johnson | G06F 11/2033 |
| 2019/0005576 | A1* | 1/2019 | Mick | H04L 41/5054 |
| 2019/0146850 | A1* | 5/2019 | Quinn | H04L 41/082 709/226 |
| 2019/0158428 | A1* | 5/2019 | Gray | H04L 47/2483 |
| 2019/0386902 | A1 | 12/2019 | Mueller et al. | |
| 2020/0097358 | A1 | 3/2020 | Mahindru et al. | |
| 2020/0136920 | A1 | 4/2020 | Doshi et al. | |
| 2020/0167196 | A1 | 5/2020 | Smith et al. | |
| 2021/0011765 | A1* | 1/2021 | Doshi | G06F 9/5077 |
| 2021/0144517 | A1* | 5/2021 | Guim Bernat | G06F 9/5072 |
| 2021/0224093 | A1* | 7/2021 | Fu | G06F 9/5072 |
| 2021/0234923 | A1* | 7/2021 | Kumar | H04L 43/16 |
| 2021/0409282 | A1* | 12/2021 | Patki | H04L 41/042 |
| 2023/0036765 | A1 | 2/2023 | Kuniko | |
| 2023/0367654 | A1* | 11/2023 | Kurian | G06F 9/5083 |

OTHER PUBLICATIONS

"Search Report and Written Opinion Issued in Netherland Patent Application No. N2026456", Mailed Date: Apr. 28, 2021, 12 Pages.
"International Search Report and Written Opinion Issued in PCT Application No. PCT/US21/049947", Mailed Date: Jan. 3, 2022, 15 Pages.
Communication 94(3) Received for European Application No. 21782852.4, mailed on Apr. 29, 2024, 8 pages.
Communication 94(3) Received for European Application No. 21782852.4, mailed on Feb. 6, 2024, 9 pages.
Decision to grant a European patent pursuant to Article 97(1) received in European Application No. 21782852.4, mailed on Oct. 30, 2025, 3 pages.
Decision to Grant Received for Japan Application No. 2023-516151, mailed on Feb. 2, 2026, 5 pages. (English Translation Provided).
First Office Action Received for Chinese Application No. 202180062406.0, mailed on Nov. 25, 2025, 20 pages. (English Translation Provided).
Office Action Received for Mexican Application No. MX/a/2023/002701, mailed on Dec. 16, 2025, 12 Pages (English Translation Provided).
Search Report and Written opinion Received for Singapore Application No. 11202301555R, mailed on Nov. 26, 2025, 07 pages.
Communication Under Rule 71(3) EPC, Received for European Application No. 21782852.4, mailed on Jul. 30, 2025, 09 pages.
First Examination Report Received for Indian Application No. 202317014513, mailed on Aug. 19, 2025, 08 pages.
Office Action Received for Japan Application No. 2023-516151, mailed on Jul. 15, 2025, 8 pages. (English Translation Provided).
Office Action Received for Australian Application No. 2021340717, mailed on Jun. 24, 2026, 03 Pages.
Second Office Action Received for Chinese Application No. 202180062406.0, mailed on Jun. 1, 2026, 20 pages. (English Translation Provided).

* cited by examiner

Edge Zone 310

Rack 334a
Node 336a-1
Node 336a-2
Node 336a-3
Node 336a-4
Node 336a-5
Node 336a-6
Node 336a-7
Node 336a-8
Node 336a-9
Node 336a-10
Nodes 336a Rack 334b
Node 336b-1
Node 336b-2
Node 336b-3
Node 336b-4
Node 336b-5
Node 336b-6
Node 336b-7
Node 336b-8
Node 336b-9
Node 336b-10
Nodes 336b Rack 334c
Node 336c-1
Node 336c-2
Node 336c-3
Node 336c-4
Node 336c-5
Node 336c-6
Node 336c-7
Node 336c-8
Node 336c-9
Node 336c-10
Nodes 336c Nodes 336

Time = $t_0$

Edge Zone 310

Rack 334a
Node 336a-1
Node 336a-2
Node 336a-3
Node 336a-4
Node 336a-5
Node 336a-6
Node 336a-7
Node 336a-8
Node 336a-9
Node 336a-10
Nodes 336a Rack 334b
Node 336b-1
Node 336b-2
Node 336b-3
Node 336b-4
Node 336b-5
Node 336b-6
Node 336b-7
Node 336b-8
Node 336b-9
Node 336b-10
Nodes 336b Rack 334c
Node 336c-1
Node 336c-2
Node 336c-3
Node 336c-4
Node 336c-5
Node 336c-6
Node 336c-7
Node 336c-8
Node 336c-9
Node 336c-10
Nodes 336c Nodes 336

Time = $t_1$

Edge Zone 310

Rack 334a

Node 336a-1
Node 336a-2
Node 336a-3
Node 336a-4
Node 336a-5
Node 336a-6
Node 336a-7
Node 336a-8
Node 336a-9
Node 336a-10

Nodes 336a

Rack 334b

Node 336b-1
Node 336b-2
Node 336b-3
Node 336b-4
Node 336b-5
Node 336b-6
Node 336b-7
Node 336b-8
Node 336b-9
Node 336b-10

Nodes 336b

Rack 334c

Node 336c-1
Node 336c-2
Node 336c-3
Node 336c-4
Node 336c-5
Node 336c-6
Node 336c-7
Node 336c-8
Node 336c-9
Node 336c-10

Nodes 336c

Nodes 336

Time = $t_2$

AUTOMATIC NODE FUNGIBILITY BETWEEN COMPUTE AND INFRASTRUCTURE NODES IN EDGE ZONES

CROSS REFERENCE TO RELATED APPLICATIONS

This application is a U.S. Nationalization of PCT Application Number PCT/US2021/049947, filed on Sep. 10, 2021, which claims priority to Netherlands Patent Application No. 2026456, filed Sep. 11, 2020, the entireties of which are incorporated herein by reference.

BACKGROUND

A cloud-computing system may refer to a collection of computing devices or resources that can be accessed remotely. Stated another way, cloud computing may be described as the delivery of computing services (such as storage, databases, networking, software, applications, processing, or analytics) over the Internet. Clients may access a cloud-computing system through a client device. The cloud-computing system may include resources that provide services to clients. These resources may include processors, memory, storage, and networking hardware.

A cloud-computing system may include a number of data centers that may be located in different geographic locations. Each data center may include many servers. A server may be a physical computer system. The cloud-computing system may run virtual machines on a server. A virtual machine may be a program that emulates a distinct computer system but that can run on a server with other virtual machines. Like a physical computer, a virtual machine may include an operating system and applications.

Data centers may be located far away from large population centers and from clients who access the cloud-computing system. The distance between the client and the data centers may cause a client to experience latency in accessing the cloud-computing system or running workloads on the cloud-computing system.

SUMMARY

In accordance with one aspect of the present disclosure, a cloud-computing system is disclosed that provides services to a client. The cloud-computing system includes a data center that includes a first set of nodes. The data center has a first geographic location different from a second geographic location of the client. The cloud-computing system also includes an edge zone that includes a second set of nodes. The edge zone has a third geographic location. The second geographic location is more proximate to the third geographic location than the first geographic location. The first set of nodes are greater in number than the second set of nodes. The second set of nodes includes a first pool of nodes for performing workloads of the client and a second pool of nodes for providing services other than performing the workloads of the client. The cloud-computing system also includes a node pool manager that receives health information and usage information for the second pool of nodes. The node pool manager also determines, based on the health information and the usage information, to re-provision a node between the first pool of nodes and the second pool of nodes. The node pool manager also causes the node to be re-provisioned based on the determination.

The second pool of nodes may provide auxiliary services that support proper functioning of the edge zone or proper functioning of virtual machines hosted on the edge zone.

The health information may indicate a health of resources of the second pool of nodes. The usage information may indicate an amount of utilization of the second pool of nodes. The node pool manager may determine to re-provision the node between the first pool of nodes and the second pool of nodes if the second pool of nodes is over utilized or under utilized.

The node pool manager may include a maximum threshold and the node pool manager may determine to re-provision the node from the first pool of nodes to the second pool of nodes if the second pool of nodes is operating at or above the maximum threshold.

The node pool manager may determine whether the second pool of nodes is operating at or above the maximum threshold based on a current operating capacity of the second pool of nodes.

The node pool manager may include a maximum threshold and an overutilization time period. The node pool manager may determine to re-provision the node from the first pool of nodes to the second pool of nodes if the second pool of nodes has been operating at or above the maximum threshold for the overutilization time period.

The node pool manager may include a minimum threshold and the node pool manager may determine to re-provision the node from the second pool of nodes to the first pool of nodes if the second pool of nodes is operating at or below the minimum threshold.

The node pool manager may include a minimum threshold and an underutilization time period and the node pool manager may determine to re-provision the node from the second pool of nodes to the first pool of nodes if the second pool of nodes has been operating at or below the minimum threshold for the underutilization time period.

The node pool manager may be located in the data center.

The second set of nodes may include a third pool of nodes for providing storage services.

A latency of the client interacting with the workloads of the client on the edge zone may be less than a latency of the client interacting with other workloads of the client on the data center.

In accordance with another aspect of the present disclosure, a method is disclosed for re-allocating nodes between a first node pool and a second node pool of an edge zone. The edge zone is part of a cloud-computing system, is managed by a data center of the cloud-computing system, and has a geographic location different from the data center. The method includes receiving health information for the first node pool and the second node pool. The first node pool executes workloads for a client and the second node pool provides services other than executing the workloads for the client. The method also includes receiving usage information for the second node pool. The method also includes determining, based on the health information and the usage information, to modify an allocation of nodes between the first node pool and the second node pool. Modifying the allocation of the nodes between the first node pool and the second node pool includes re-assigning a node from the first node pool to the second node pool or re-assigning a node from the second node pool to the first node pool. The method also includes causing modification of the allocation of the nodes between the first node pool and the second node pool based on the determination.

Determining to modify the allocation of nodes between the first node pool and the second node pool may be further based on determining that the second node pool is over utilized or under utilized.

The method may further include determining, based on the health information and the usage information, to re-provision a selected node from the first node pool to the second node pool. The method may also include causing re-provisioning of the selected node from the first node pool to the second node pool.

The method may further include receiving execution information for the first node pool and selecting for re-provisioning, based on the health information and the execution information, the selected node from the first node pool.

Selecting the selected node from the first node pool may include determining whether the selected node is executing any of the workloads for the client.

Selecting the selected node from the first node pool may include determining whether the node is executing a fewest number of the workloads for the client as compared to other nodes in the first node pool.

The method may further include migrating any workloads executing on the selected node to one or more other nodes in the first node pool.

In accordance with another aspect of the present disclosure, a computer-readable medium is disclosed that includes instructions that are executable by one or more processors to cause a computing system to receive health information for infrastructure nodes included in an edge zone. The edge zone is part of a cloud-computing system. The cloud-computing system includes a data center separate from the edge zone. The edge zone is more proximate to a client than the data center. The instructions are also executable by one or more processors to receive usage information for the infrastructure nodes. The instructions are also executable by one or more processors to determine, based on the health information and the usage information, that the infrastructure nodes have been operating above a maximum percentage of capacity for an overutilization time period. The instructions are also executable by one or more processors to cause, based on the determination that the infrastructure nodes have been operating above the maximum percentage of capacity for the overutilization time period, an infrastructure node of the infrastructure nodes to be re-provisioned as a compute node. The instructions are also executable by one or more processors to determine, based on the health information and the usage information, that the infrastructure nodes have been operating below a minimum percentage of capacity for an underutilization time period. The instructions are also executable by one or more processors to cause, based on the determination that the infrastructure nodes have been operating below the minimum percentage of capacity for the underutilization time period, a node of the edge zone to be added to the infrastructure nodes.

The computer-readable medium may further include instructions that are executable by one or more processors to cause the computing system to determine, based on the health information and the usage information, that the infrastructure node is a best node from among the infrastructure nodes for re-provisioning. The instructions may also be executable by one or more processors to migrate services running on the infrastructure node to one or more other nodes of the infrastructure nodes.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description that follows. Features and advantages of the disclosure may be realized and obtained by means of the systems and methods that are particularly pointed out in the appended claims. Features of the present disclosure will become more fully apparent from the following description and appended claims, or may be learned by the practice of the disclosed subject matter as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. Understanding that the drawings depict some example embodiments, the embodiments will be described and explained with additional specificity and detail through the use of the accompanying drawings in which.

DETAILED DESCRIPTION

Figure 1:
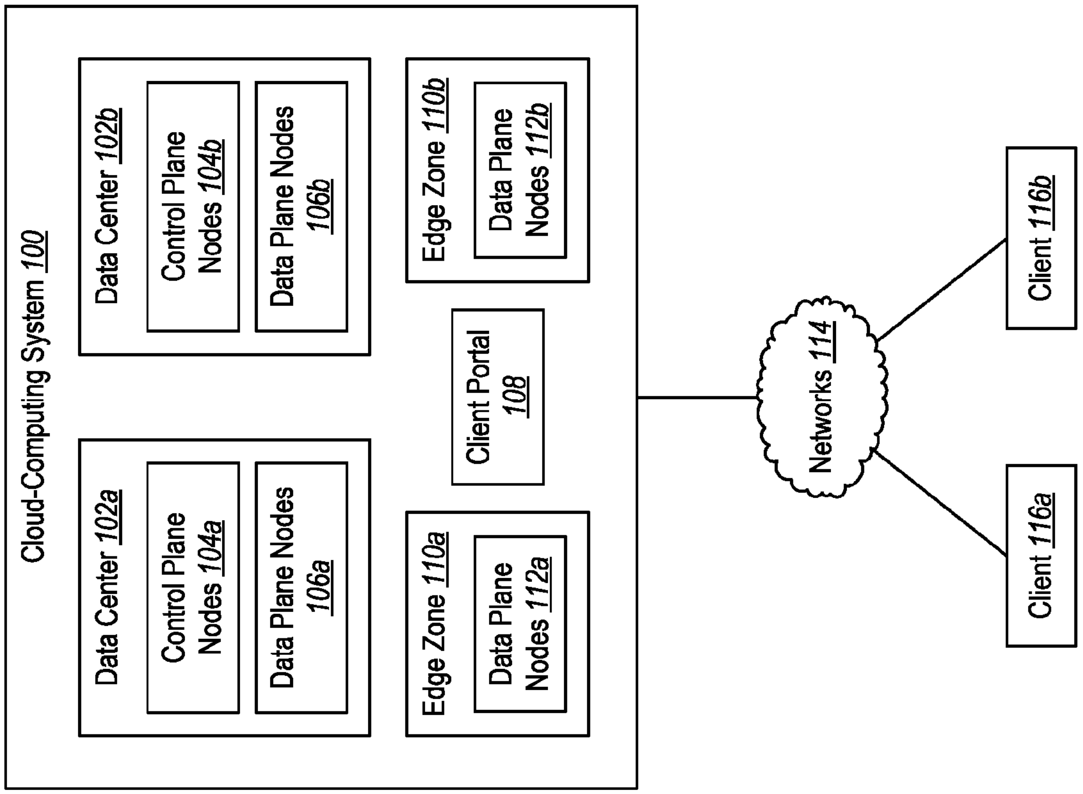
FIG. 1 illustrates an example cloud-computing system that includes data centers and edge zones and provides services to clients.

This disclosure concerns systems and methods for dynamically modifying allocation of nodes in an edge zone that is part of a cloud-computing system. The nodes may be moved between an infrastructure node pool (which may host auxiliary services critical to proper functioning of the edge zone) and a compute node pool (which may run client workloads). The edge zone may reside at a location geographically close to a client whose workloads execute on the edge zone. Hosting client workloads on the edge zone may offer better latency profiles for compute-intensive and latency-sensitive workloads than hosting the workloads at a data center of the cloud-computing system. The edge zone may, however, include far fewer nodes than the data center. To maximize use of the edge zone nodes for executing client workloads the cloud-computing system may dynamically re-provision infrastructure nodes to be compute nodes when the infrastructure nodes are being underutilized. Similarly, to ensure proper functioning of the edge zone the cloud-computing system may re-provision compute nodes to be infrastructure nodes when the infrastructure nodes are being over utilized. In this way, the cloud-computing system may maintain an optimal balance between resources devoted to supporting the edge zone and resources devoted to running the client's workloads.

A cloud-computing system may refer to a collection of computing devices or resources that can be accessed remotely. The cloud-computing system may provide computing services to clients. For example, a client may use a local device to remotely access an application hosted on the cloud-computing system. The application may be a workload of the client. A workload may be a discrete amount of work to be executed, a collection of code that can be executed (such as an application), a discrete service (such as a web server, a database, or a container), or a discrete set of computing resources. A customer workload may be a workload deployed by the customer, sent by the customer, or that is executing at the request of the customer.

The cloud-computing system may include a number of data centers located in different geographic locations. Each data center may include multiple servers. A server may be a physical computer system. The server may include multiple virtual containers (such as virtual machines). Each virtual container may provide services to a client, host applications of the client, or execute workloads of the client.

The data centers may be located far away from large population centers and from clients who access the cloud-computing system. The data centers may be large real-estate complexes that require significant amounts of power to operate. Land may be more available and less expensive in less populated areas. Similarly, power may be cheaper and easier to access in less populated areas. The distance between the client and the data center may cause a client to experience latency in accessing the cloud-computing system and services (such as client workloads) hosted on the cloud-computing system. Latency may be an amount of delay from a first time at which a client provides information to the cloud-computing system and a second time at which the client receives a response from the cloud-computing system.

To reduce latency a cloud-computing system may include edge zones. The edge zones may be much smaller in physical size than data centers. For example, an edge zone may contain one to twenty racks while a data center may include thousands of racks. The edge zones may be part of the cloud-computing system and be connected to the data center through the cloud-computing system's secure network and backbone. The edge zones may, however, be located closer to users of the cloud-computing system. For example, the edge zones may be located in large population centers (such as New York City, USA), at a client's location (such as in an office building of the client), or at an intermediate location between a client and the data center (such as at a mobile carrier's data center). The edge zones may provide secure, reliable, high-bandwidth connectivity between applications that run at the edge zone and the user. The edge zones may offer a full set of cloud-computing services. The edge zones may be owned and operated by an operator of the cloud-computing system. Clients may use the same set of tools and the same portal to manage and deploy services into the edge zones as the clients use for the cloud-computing system generally.

When an edge zone is deployed at a location of a client, the edge zone may enable low-latency access to workloads, such as computing and storage services. The edge zone may allow the client to deploy applications from independent software vendors (ISVs) and virtualized network functions (VNFs) as applications managed by the cloud-computing system along with virtual machines and containers on-premises. These VNFs may include mobile packet cores, routers, firewalls, and SD-WAN appliances. The edge zone may include a cloud-native orchestration solution that lets the client manage the lifecycles of VNFs and applications from the cloud-computing system portal. The edge zone may also run private mobile networks (private LTE, private 5G), implement security functions like firewalls, extend the client's on-premises networks across multiple branches and the cloud-computing system by using software-defined networking in a wide-area network (SD-WAN) appliances on the same edge zone appliances and manage them through the cloud-computing system.

Clients may deploy workloads (such as virtual machines, containers, applications, and other cloud-computing services) into the edge zone and interact with those workloads (such as providing data to and receiving data from those workloads) without going through a data center. As a result, the edge zone may satisfy the low-latency and high-throughput requirements of certain applications much better than a data center. Some example use case scenarios for an edge zone may include: real-time command and control in robotics; real-time analytics and inferencing via artificial intelligence and machine learning; machine vision; remote rendering for mixed reality and virtual desktop infrastructure (VDI) scenarios; immersive multiplayer gaming; media streaming and content delivery; and surveillance and security.

An edge zone may include different categories or pools of nodes. The categories of nodes may include compute nodes (where a client's workloads run in a virtualized environment), storage nodes (where managed disks, blobs, operating system images etc. reside), and infrastructure nodes (where certain auxiliary services critical to the edge zone and required to be local to the edge zone are running). Having an adequate number of infrastructure nodes may be critical for the edge zone. Virtual machines deployed on the edge zone may fail to operate smoothly or as expected if the infrastructure nodes are unavailable or do not have sufficient capacity to serve the needs of workloads executing on the edge zone.

Even though the infrastructure nodes are critical to an edge zone, infrastructure nodes reduce the number of nodes available to execute a client's workloads. As noted above, edge zones have a limited number of nodes. That means as the number of infrastructure nodes increases, the number of nodes available to serve as compute nodes decreases. A high number of infrastructure nodes results in an edge zone with a low compute density. Clients may prefer that the edge zone have as high a compute density as possible. To improve client satisfaction the cloud-computing system may dynamically adjust a number of infrastructure nodes in an edge zone based on current circumstances in order to maintain an optimum number of infrastructure nodes. An optimum number of infrastructure nodes may be a minimum number of infrastructure nodes sufficient to support workloads executing on the edge zone. Based on health of the infrastructure nodes and utilization of the infrastructure nodes, the cloud-computing system may automatically scale up and down a number of infrastructure nodes by taking nodes from and giving nodes to the compute node pool. The cloud-computing system may give priority to the infrastructure nodes and ensure there are a sufficient number of healthy infrastructure nodes available but may shift infrastructure nodes to the compute node pool to improve compute density of the edge zone when possible.

An edge zone may begin with a predefined number of nodes allocated to an infrastructure node pool. The remainder of the nodes may be allocated to other node pools, including a compute node pool and a storage node pool. As the edge zone operates, an infrastructure monitor may collect various telemetry data from the infrastructure node pool indicating utilization of the infrastructure node pool. The infrastructure monitor may update a machine pool manager on usage of the infrastructure node pool. The machine pool manager may determine that the infrastructure node pool is over utilized (either because of high demand or unhealthy machines in the infrastructure node pool that are unable to provide services). For example, the machine pool manager may determine that healthy nodes in the infrastructure node pool are running above a predetermined threshold percentage of capacity. Upon making that determination, the machine pool manager may identify a best node in the compute node pool to move to the infrastructure node pool and request that a node manager move and re-provision the best node to the infrastructure node pool. Similarly, when the machine pool manager sees that the infrastructure node pool is under utilized, the machine pool manager may select a node from the infrastructure node pool and add the node to the compute node pool, thereby increasing compute capacity at the edge zone.

Dynamically reallocating nodes back and forth between the infrastructure node pool and the compute node pool may not be necessary in a data center because the data center may (because of its size) include many free nodes in the compute node pool and the infrastructure node pool. The free nodes may serve as back up capacity for when nodes become unhealthy or as extra capacity for scaling up when additional capacity is required. But in an edge zone, which may include a limited number of nodes, the compute node pool and the infrastructure node pool may not include spare nodes. Applying the disclosed systems and methods may allow the cloud-computing system to efficiently manage the limited resources of the edge zone. The disclosed systems and methods may ensure that an adequate number of nodes are available for critical infrastructure workloads in the infrastructure node pool without over-allocating resources to infrastructure workloads. Nodes that are not needed for infrastructure workloads may then be utilized for running customer workloads. In this way, the cloud-computing system may maintain a maximum compute density at the edge zone based on current infrastructure needs.

Dynamically and automatically adjusting the allocation of nodes between an infrastructure node pool and a compute node pool may have benefits beyond maximizing available compute power of the edge zone. Automatic node fungibility may enable harvest virtual machine capability in the edge zone. A harvest virtual machine may be a lower-priority virtual machine that scales up and down in size based on availability of resources and terminates when less than a minimum amount of resources are available. Thus, dynamic node allocation may allow customers to run low-priority batch workloads on the edge zone using extra nodes that are harvested from an underutilized infrastructure node pool (and may subsequently be assigned back to the infrastructure node pool). Automatic node fungibility may increase reliability of the edge zone. Infrastructure nodes may be crucial for the operation of an edge zone. When nodes in the infrastructure node pool become unhealthy, the cloud-computing system can swap the unhealthy nodes for healthy nodes. Automatic node fungibility may also allow for automatic fine tuning of an edge zone. The edge zone can fine tune itself based on the types of workloads it is executing. An edge zone that is more compute intensive may maintain a minimum number of infrastructure nodes. In contrast, an edge zone with high network I/O intensive workloads may maintain a greater number of infrastructure nodes.

FIG. 1 illustrates an example cloud-computing system 100. The cloud-computing system 100 may include data centers 102*a*, 102*b*, edge zones 110*a*, 110*b*, and a client portal 108.

The cloud-computing system 100 may be a collection of computing devices or resources that can be accessed remotely. The cloud-computing system 100 may provide computing services over networks 114 (such as the Internet) to clients 116*a*, 116*b*.

The data centers 102*a*, 102*b* may be large real-estate complexes that include many servers (which may be referred to as machines or nodes). A server may be a physical computer system. The server may include multiple virtual containers (such as virtual machines). The multiple virtual containers may execute workloads for clients, such as the clients 116*a*, 116*b*. The virtual containers may also be considered workloads of the clients 116*a*, 116*b*. The clients 116*a*, 116*b* may use the client portal 108 to access the cloud-computing system 100 and request that the cloud-computing system 100 deploy a workload. The clients 116*a*, 116*b* may specify a region for deploying the workload through the client portal 108. The clients 116*a*, 116*b* may specify the edge zones 110*a*, 110*b* for deploying the workload through the client portal 108.

The nodes located in the data centers 102*a*, 102*b* may be organized into control plane nodes 104*a*, 104*b* and data plane nodes 106*a*, 106*b*. The data plane nodes 106*a*, 106*b* may execute workloads for the clients. The control plane nodes 104*a*, 104*b* may not execute the workloads for the clients but instead may manage the data plane nodes 106*a*, 106*b*. For example, a control plane node within the control plane nodes 104*a*, 104*b* may receive notice of a workload that needs to be deployed and executed. The control plane node may select a specific data plane node to execute the workload and may select a specific virtual machine on the specific data plane node to execute the workload.

The data plane nodes 106*a*, 106*b* may be a higher percentage of all nodes located at the data centers 102*a*, 102*b* than the control plane nodes 104*a*, 104*b*. For example, the data plane nodes 106*a*, 106*b* may be 80% to 90% of all the nodes located at the data centers 102*a*, 102*b*. Nevertheless, the control plane nodes 104*a*, 104*b* may be a large overhead cost for the data centers 102*a*, 102*b*. For example, the data center 102*a* may require that 2,000 nodes belong to the control plane nodes 104*a*.

The data center 102*a* may have a geographic location different from a geographic location of the data center 102*b*. Because the data centers 102*a*, 102*b* may require large areas of land and large amounts of power, the data centers 102*a*, 102*b* may be located far away from large population centers and from the clients 116*a*, 116*b* who access the cloud-computing system 100. As a result, the clients 116*a*, 116*b* may experience latency in accessing the cloud-computing system 100 and services and applications hosted on the nodes located in the data centers 102*a*, 102*b*. For example, assume the data center 102*a* is located a long distance from the client 116*a*. Assume the client 116*a* causes the cloud-computing system 100 to deploy an application on the data center 102*a*. Assume that the client 116*a* later sends data to the application for processing. The application may perform a computation on the data and sends results of the computation back to the client 116*a*. Because of the long distance between the client 116*a* and the data center 102*a*, the data may take a long time to travel to the data center 102*a*, and the results may take a long time to travel to the client 116*a*. That time may be at least 100 ms.

The clients 116*a*, 116*b* may, however, need the cloud-computing system 100 to provide services with low latency. In other words, the clients 116*a*, 116*b* may have local workloads that require a faster response time from the cloud-computing system 100 than is possible when the data centers 102*a*, 102*b* are located far from the clients 116*a*, 116*b*. The clients 116*a*, 116*b* may need to send data to and receive data from the data centers 102*a*, 102*b* faster than the physical distance between the clients 116*a*, 116*b* and the data centers 102*a*, 102*b* may permit.

To allow the clients 116*a*, 116*b* to use the cloud-computing system 100 for workloads that require low-latency computation and access the cloud-computing system 100 may include the edge zones 110*a*, 110*b*. The edge zones 110*a*, 110*b* may be at a physical location different from the data centers 102*a*, 102*b*. In particular, the edge zones 110*a*, 110*b* may be located much closer to the clients 116*a*, 116*b* than the data centers 102*a*, 102*b*. For example, assume that the data center 102*b* is located in West Virginia, USA and that the client 116*b* is a consulting firm with office space located in New York City, New York, USA. Assume the client 116*b* needs to access real-time analytics and inferencing services or applications hosted on the cloud-computing system 100. In that case, the edge zone 110*b* may be located within the office space of the client 116*b*. As a result, the client 116*b* may be able to deploy workloads to applications hosted on the edge zone 110*b* (and receive communications from the applications) with much lower latency than the client 116*b* can deploy workloads to applications hosted at the data center 102*b*.

The edge zones 110*a*, 110*b* may include data plane nodes 112*a*, 112*b*. The edge zones 110*a*, 110*b* may use the data plane nodes 112*a*, 112*b* to host applications and execute workloads of the clients 116*a*, 116*b*. Because applications and workloads hosted on the edge zones 110*a*, 110*b* may be much closer to the clients 116*a*, 116*a* than applications hosted in the data centers 102*a*, 102*b*, the clients 116*a*, 116*b* may be able to access and receive information from applications and workloads hosted on the edge zones 110*a*, 110*b* with much lower latency than is possible with applications hosted in the data centers 102*a*, 102*b*. The edge zones 110*a*, 110*b* may include significantly fewer data plane nodes than the data centers 102*a*, 102*b*. For example, the edge zones 110*a*, 110*b* may include one to twenty racks each while the data centers 102*a*, 102*b* may include thousands of racks each.

Unlike the data centers 102*a*, 102*b*, the edge zones 110*a*, 110*b* may not include control plane nodes. Instead, the control plane nodes 104*a*, 104*b* located in the data centers 102*a*, 102*b* may manage the data plane nodes 112*a*, 112*b* located in the edge zones 110*a*, 110*b*. The control plane nodes 104*a*, 104*b* may be connected to the data plane nodes 112*a*, 112*b* of the edge zones 110*a*, 110*b* through a secure channel. In this way, the clients 116*a*, 116*b* may receive low-latency computation without having to manage the data plane nodes 112*a*, 112*b* or provide physical space and power for nodes that manage the data plane nodes 112*a*, 112*b*.

Using the control plane nodes 104*a*, 104*b* to manage the data plane nodes 112*a*, 112*b* located in the edge zones 110*a*, 110*b* instead of deploying control plane nodes on the edge zones 110*a*, 110*b* may allow the clients 116*a*, 116*b* to make more efficient use of the edge zones 110*a*, 110*b*. Because the clients 116*a*, 116*b* may have the edge zones 110*a*, 110*b* on site and may be responsible for cooling and powering the edge zones 110*a*, 110*b*, the clients 116*a*, 116*b* may want as many nodes as possible on the edge zones 110*a*, 110*b* executing workloads of the clients 116*a*, 116*b*. By outsourcing management of the data plane nodes 112*a*, 112*b* to the control plane nodes 104*a*, 104*b*, the clients 116*a*, 116*b* may obtain low-latency computation without having to store, power, or cool control plane nodes.

Even though the edge zones 110*a*, 110*b* may not include control plane nodes, the edge zones 110*a*, 110*b* may require that some nodes in the data plane nodes 112*a*, 112*b* perform functions other than executing client workloads. These functions may include providing services that support the execution of client workloads and hosting virtual machines and applications that execute client workloads. For example, the data plane nodes 112*a*, 112*b* may include three different categories of nodes. First, the data plane nodes 112*a*, 112*b* may include compute nodes for hosting applications and executing workloads of the clients 116*a*, 116*b*. Second, the data plane nodes 112*a*, 112*b* may include infrastructure nodes for providing auxiliary services critical to the edge zones 110*a*, 110*b*. Unlike the control plane nodes, the infrastructure nodes may need to be local to the edge zones 110*a*, 110*b*. Third, the data plane nodes 112*a*, 112*b* may include storage nodes for storing data of the clients 116*a*, 116*b*. The storage nodes may have a hardware configuration different from the compute nodes and the infrastructure nodes because the storage nodes may be designed and optimized for data storage and data input and output. The compute nodes and the infrastructure nodes may, however, have similar hardware configurations.

Because the edge zones 110*a*, 110*b* may include a limited number of nodes and because the clients 116*a*, 116*b* may want as high a percentage of those nodes dedicated to workload execution as possible, the cloud-computing system 100 may seek to optimize how many of the data plane nodes 112*a*, 112*b* are provisioned as infrastructure nodes. The cloud-computing system 100 may initially designate a predefined number of the data plane nodes 112*a*, 112*b* as infrastructure nodes. After the edge zones 110*a*, 110*b* begin operating, the cloud-computing system 100 may collect telemetry data to track usage and health of the infrastructure nodes.

The cloud-computing system 100 may detect, based on the telemetry data, that the infrastructure nodes are over utilized (which may mean they are operating above a predetermined threshold percentage of capacity). The infrastructure nodes may be over utilized because of high demand or because of unhealthy machines unable to perform necessary operations. When the infrastructure nodes are over utilized, the cloud-computing system 100 may identify a compute node that can be re-provisioned as an infrastructure node and re-assign the compute node to be an infrastructure node.

The cloud-computing system 100 may detect, based on the telemetry data, that the infrastructure nodes are under utilized (which may occur if the infrastructure nodes are operating below a predetermined threshold percentage of capacity). When the infrastructure nodes are under utilized, he cloud-computing system 100 may identify an infrastructure node that can be re-provisioned as a compute node and re-assign the infrastructure node to be a compute node.

By continuously monitoring the infrastructure nodes and dynamically re-allocating nodes between the infrastructure nodes and the compute nodes based on current circumstances, the cloud-computing system 100 may continuously enable the edge zones 110*a*, 110*b* to utilize a maximum number of the data plane nodes 112*a*, 112*b* for execution of client workloads.

Figure 2:
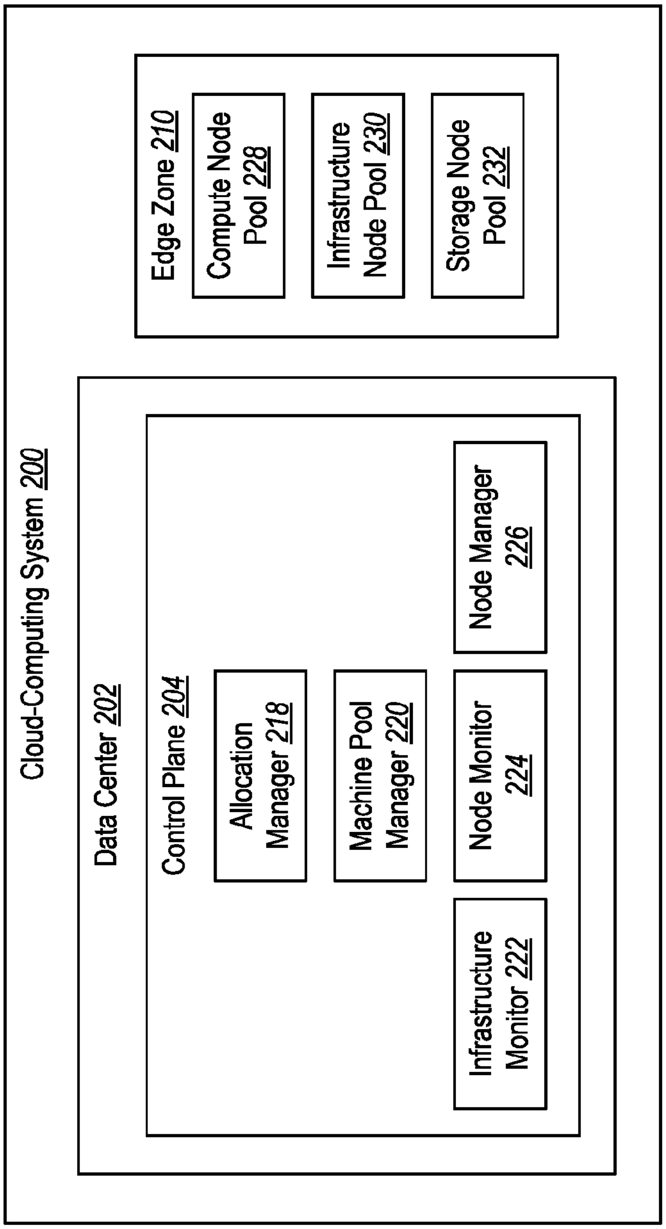
FIG. 2 illustrates an example cloud-computing system that includes an edge zone with a compute node pool, an infrastructure node pool, and a storage node pool.

FIG. 2 is an example of a cloud-computing system 200. The cloud-computing system 200 may include a data center 202 and an edge zone 210. The data center 202 may be located a long distance from the edge zone 210. The data center 202 may have a much larger amount of computing resources than the edge zone 210. Although the cloud-computing system 200 shown in FIG. 2 shows only a single data center and a single edge zone, the cloud-computing system 200 may include multiple data centers and multiple edge zones.

The edge zone 210 may include nodes. The nodes may be distributed among at least three node pools: a compute node pool 228, an infrastructure node pool 230, and a storage node pool 232. The compute node pool 228 may include one or more nodes that execute client workloads. The compute node pool 228 may execute workloads in virtualized environments. The infrastructure node pool 230 may include one or more nodes that provide auxiliary services that support the edge zone 210 and must be local to the edge zone 210. The storage node pool 232 may include one or more nodes that include managed disks, blobs, and operating system images. Each node on the edge zone 210 may belong to only one node pool at any given point in time. Each node on the edge zone 210 may be restricted to performing services for which the node pool to which it belongs is responsible. For example, a node assigned to the compute node pool 228 may not be assigned to provide services that are the responsibility of the infrastructure node pool 230.

The data center 202 may include a control plane 204. The control plane 204 may include one or more nodes. Although not shown in FIG. 2, the data center 202 may include a data plane that includes data plane nodes. The control plane 204 may control the cloud-computing system 200. The control plane 204 may manage the data plane nodes, including nodes located in the edge zone 210. The control plane 204 may include an allocation manager 218, a machine pool manager 220, an infrastructure monitor 222, a node monitor 224, and a node manager 226. Although FIG. 2 shows the allocation manager 218, the machine pool manager 220, the infrastructure monitor 222, the node monitor 224, and the node manager 226 as being located in the data center 202, in other designs one or more of the allocation manager 218, the machine pool manager 220, the infrastructure monitor 222, the node monitor 224, and the node manager 226 may be located in the edge zone 210. The functions described with respect to each of the allocation manager 218, the machine pool manager 220, the infrastructure monitor 222, the node monitor 224, and the node manager 226 may, in other designs, be performed by any of the allocation manager 218, the machine pool manager 220, the infrastructure monitor 222, the node monitor 224, and the node manager 226.

The allocation manager 218 may have visibility into all nodes in the compute node pool 228. The allocation manager 218 may determine on which node in the compute node pool 228 (or the storage node pool 232) a workload should run. The allocation manager 218 may use one or more models for allocating workloads. The one or more models may ensure efficiency, defragmentation, and minimum reallocation. The allocation manager 218 may inform the machine pool manager 220 regarding where the workload should run. Once a workload (such as a virtual machine or an application) is deployed on the compute node pool 228, a client may interact with the workload without going through the allocation manager 218. For example, the client may send data to the workload for processing without sending the data to the allocation manager 218 or the data center 202. In this way, the edge zone 210 may allow for low-latency access to the client's workloads and cloud-computing services.

The machine pool manager 220 (which may be referred to as a node pool manager) may manage nodes on the edge zone 210, including nodes in the compute node pool 228, the infrastructure node pool 230, and the storage node pool 232. The machine pool manager 220 may have full visibility and full control over the nodes on the edge zone 210. The machine pool manager 220 may move nodes across node pools (such as from the infrastructure node pool 230 to the compute node pool 228). In the alternative, the machine pool manager 220 may cause the node manager 226 to move nodes across the node pools. Moving a node across node pools may not involve moving the node's physical location. Instead, moving the node may involve removing the node from one pool and assigning the node to another pool. Thus, moving a node from a first node pool to a second node pool may be accomplished through software. The machine pool manager 220 may be designed such that it does not adjust allocation of nodes in certain pools. For example, the machine pool manager 220 may be designed to not adjust allocation of nodes in the storage node pool 232. That may be because nodes in the storage node pool have a different hardware configuration than nodes in the compute node pool 228 and the infrastructure node pool 230.

The allocation manager 218 or the machine pool manager 220 may determine whether to move a node from one node pool to another node pool. The allocation manager 218 or the machine pool manager 220 may apply one or more rules in determining whether to move a node from one node pool to another node pool. The allocation manager 218 or the machine pool manager 220 may receive data, such as from the node monitor 224, the infrastructure monitor 222, the machine pool manager 220, and the allocation manager 218, for use in determining whether to move nodes across the node pools. The allocation manager 218 or the machine pool manager 220 may determine which node from a node pool to move from one node pool to another node pool. The allocation manager 218 or the machine pool manager 220 may apply one or more rules in determining which node to move. The allocation manager 218 or the machine pool manager 220 may use data received from the node monitor 224, the infrastructure monitor 222, and the allocation manager 218 in determining which node to move.

The infrastructure monitor 222 may track usage of nodes in the infrastructure node pool 230. The infrastructure monitor 222 may collect telemetry data, such as CPU active time and network I/O, from all nodes in the infrastructure node pool 230 and determine usage of the nodes in the infrastructure node pool 230. The infrastructure monitor 222 may determine how much of a capacity of the infrastructure node pool 230 is being used. The infrastructure monitor 222 may report usage of the infrastructure node pool 230 to the machine pool manager 220. Data collected by the infrastructure monitor 222 may be used for determining whether a node in the edge zone 210 should be moved from one node pool to another node pool.

The node monitor 224 may track a health status of each node in the edge zone 210. The node monitor 224 may collect pulse points from the nodes in the edge zone 210. The node monitor 224 may collect information about a health status of resources of the nodes in the edge zone 210. The node monitor 224 may collect information about how CPUs are running, whether disks are functioning, how network I/O is functioning, and how disk I/O is functioning. The node monitor 224 may report node health status to the machine pool manager 220. Data collected by the node monitor 224 may be used for determining whether a node in the edge zone 210 should be moved from one node pool to another node pool.

The node manager 226 may manage a life cycle of a node. The node manager 226 may provision the node, assign identity to the node (which may include assigning the node to a specific node pool), and roll out correct binaries and data. The node manager 226 may receive instructions from the machine pool manager 220 regarding management of nodes on the edge zone 210.

The allocation manager 218, the machine pool manager 220, the infrastructure monitor 222, the node monitor 224, and the node manager 226 may work together to dynamically reallocate nodes between the compute node pool 228 and the infrastructure node pool 230. The allocation manager 218 may initially allocate a first predefined number of nodes (or a first predefined percentage of nodes) in the edge zone 210 to the compute node pool 228 and a second predefined number of nodes (or a second predefined percentage of nodes) in the edge zone 210 to the infrastructure node pool 230. As the edge zone 210 executes workloads, the infrastructure monitor 222 may receive usage information (which may include various telemetry data) from the infrastructure node pool 230. Similarly, the node monitor 224 may receive health information from the compute node pool 228 and the infrastructure node pool 230 regarding health of nodes in the compute node pool 228 and the infrastructure node pool 230. The infrastructure monitor 222 may provide the usage information or updates regarding usage of the infrastructure node pool 230 to the machine pool manager 220. The node monitor 224 may provide the health information or updates regarding health of nodes in the edge zone 210 to the machine pool manager 220.

The machine pool manager 220 may analyze information received from the infrastructure monitor 222 and the node monitor 224 (such as the usage information and the health information) to determine whether the infrastructure node pool 230 is over utilized. The machine pool manager 220 may determine that the infrastructure node pool 230 is over utilized if the infrastructure node pool 230 is operating above a predetermined threshold of usage (either because of high demand or unhealthy nodes in the infrastructure node pool 230). Alternatively, the machine pool manager 220 may determine that the infrastructure node pool 230 is over utilized if the infrastructure node pool 230 has been operating above the predetermined threshold of usage for a predetermined period of time. If the machine pool manager 220 determines that the infrastructure node pool 230 is over utilized, the machine pool manager 220 may identify a best node in the compute node pool 228 to migrate to the infrastructure node pool 230. The best node may be a node that is executing a smallest amount of workloads among nodes that are sufficiently healthy in the compute node pool 228. In the alternative, the best node may be any healthy node. The machine pool manager 220 may instruct the node manager 226 to move and re-provision the best node to the infrastructure node pool 230. As part of re-provisioning the best node, the machine pool manager 220 may move any workloads running on the best node to one or more other nodes in the compute node pool 228.

By way of example regarding selecting a best node, assume the machine pool manager 220 determines that a node needs to move from the compute node pool 228 to the infrastructure node pool 230. Assume two or more nodes in the compute node pool 228 are candidates to move to the infrastructure node pool 230. The two or more nodes may be candidates because the two or more nodes are sufficiently healthy. The machine pool manager 220 may prefer to re-provision a node that does not have any customer workloads running on the node. If all nodes have a customer workload running, the machine pool manager 220 may prefer a node with a fewest number or a smallest size of customer workloads running on the node. The machine pool manager 220 may have these preferences because when a node in the compute node pool 228 is re-provisioned to the infrastructure node pool 230, any customer workloads running on the node may need to be migrated to one or more other nodes in the compute node pool 228. Migrating workloads may require communication with the control plane 204 of the data center 202. The control plane 204 may move virtual machines from the node to the one or more other nodes. The control plane 204 may then give control of the node to the infrastructure node pool 230.

The machine pool manager 220 may analyze information received from the infrastructure monitor 222 and the node monitor 224 (such as the usage information and the health information) to determine whether the infrastructure node pool 230 is under utilized. The machine pool manager 220 may determine that the infrastructure node pool 230 is under utilized if the infrastructure node pool 230 is operating below a predetermined threshold of usage. Alternatively, the machine pool manager 220 may determine that the infrastructure node pool 230 is under utilized if the infrastructure node pool 230 has been operating below the predetermined threshold of usage for a predetermined period of time. If the machine pool manager 220 determines that the infrastructure node pool 230 is under utilized, the machine pool manager 220 may identify a best node in the infrastructure node pool 230 to migrate to the compute node pool 228. The best node may be a node that is hosting a smallest amount of services. The machine pool manager 220 may instruct the node manager 226 to move and re-provision the best node to the compute node pool 228. As part of re-provisioning the best node, the machine pool manager 220 may move any services running on the best node to one or more other nodes in the infrastructure node pool 230.

Figure 3A:
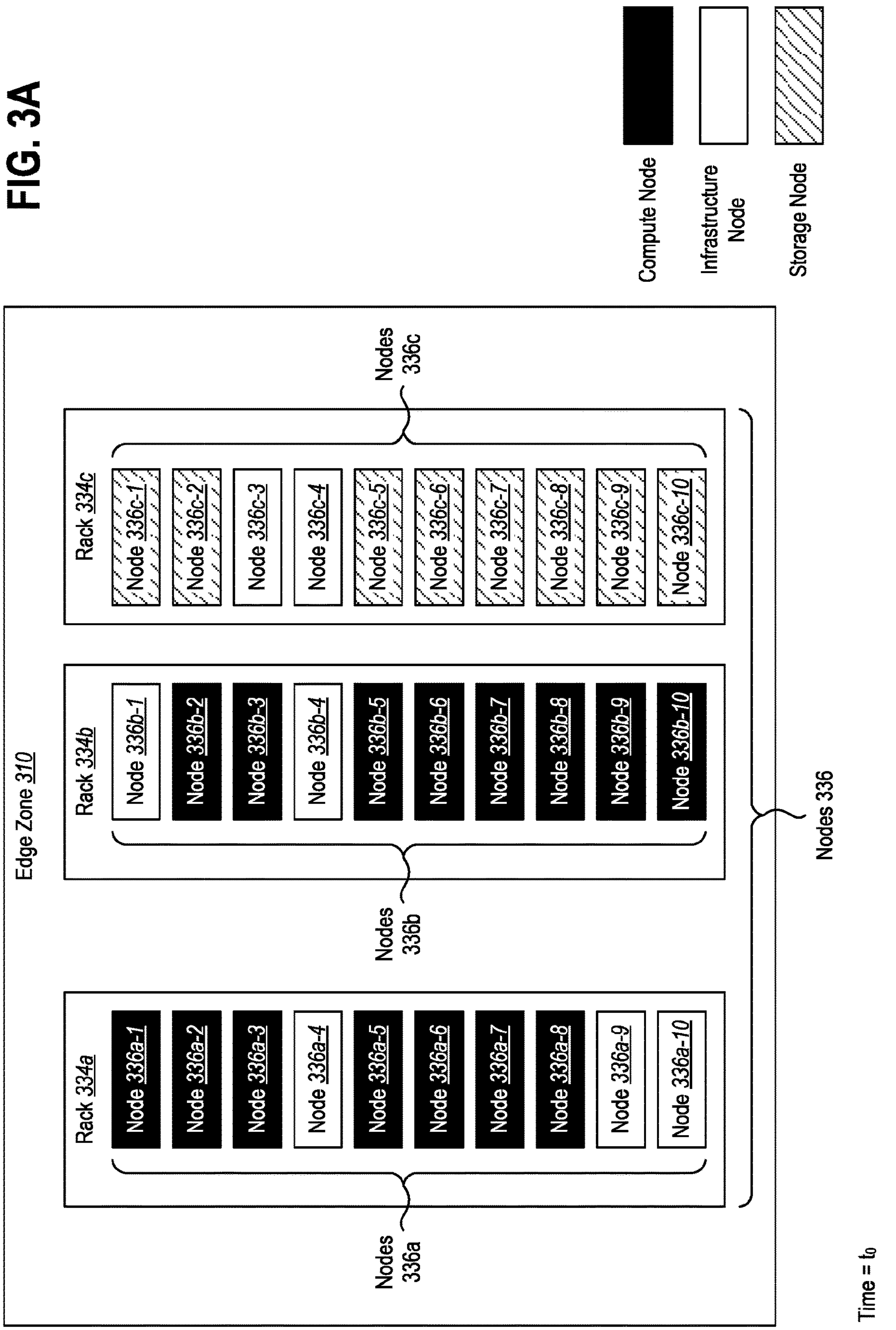
FIGS. 3A-3C illustrate an edge zone in which nodes are dynamically re-provisioned between a compute node pool and an infrastructure node pool based on usage information and health information.
Figure 3B:
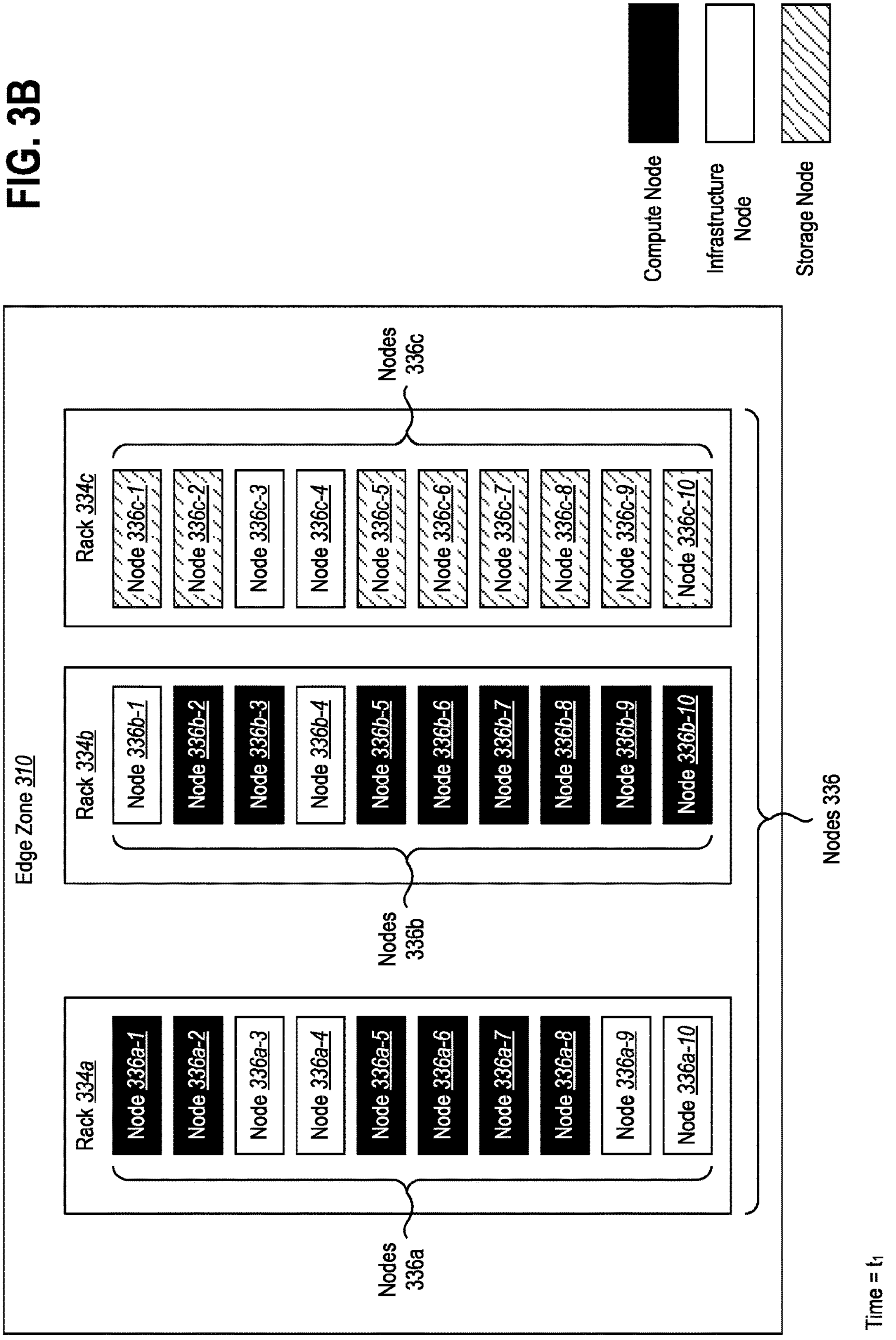
Figure 3C:
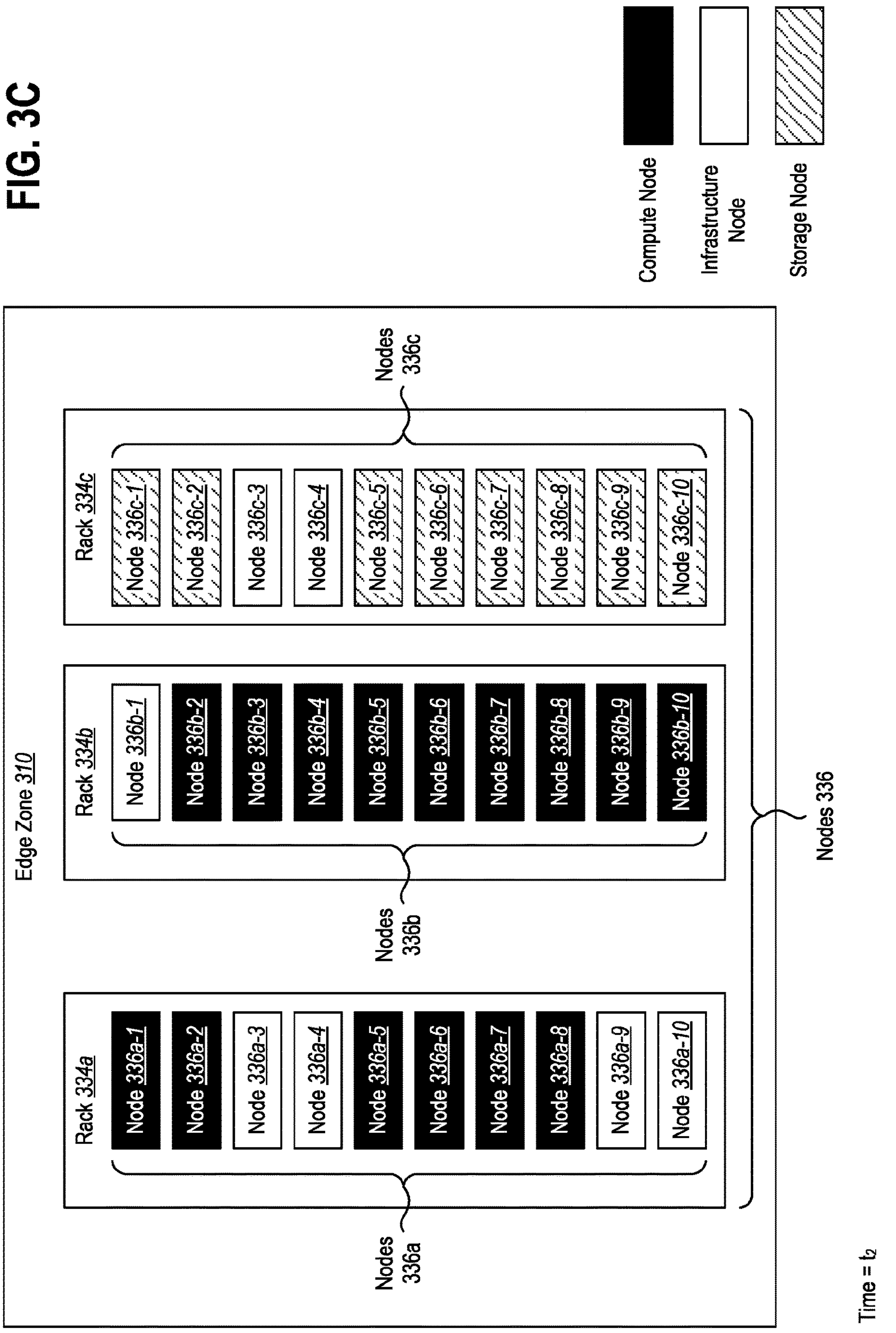

FIGS. 3A-3C illustrates an example edge zone 310. The edge zone 310 may belong to a cloud-computing system. The cloud-computing system may include an allocation manager, a machine pool manager, an infrastructure monitor, a node monitor, and a node manager. The edge zone 310 may include rack **334*a*, rack 334*b*, and rack 334*c*. The rack 334*a* may include nodes 336*a* (which may include node 336*a*-1, node 336*a*-2, node 336*a*-3, node 336*a*-4, node 336*a*-5, node 336*a*-6, node 336*a*-7, node 336*a*-8, node 336*a*-9, and node 336*a*-10). The rack 334*b* may include nodes 336*b* (which may include node 336*b*-1, node 336*b*-2, node 336*b*-3, node 336*b*-4, node 336*b*-5, node 336*b*-6, node 336*b*-7, node 336*b*-8, node 336*b*-9, and node 336*b*-10). The rack 334*c* may include nodes 336*c* (which may include node 336*c*-1, node 336*c*-2, node 336*c*-3, node 336*c*-4, node 336*c*-5, node 336*c*-6, node 336*c*-7, node 336*c*-8, node 336*c*-9, and node 336*c*-10). Although the edge zone 310 includes three racks, other edge zone designs may include fewer or more racks. The edge zone 310** may include fewer racks than a data center.

Each of the nodes 336 may be assigned to a node pool. The node pools may include a compute node pool, an infrastructure node pool, and a storage node pool. In FIGS. 3A-3C, nodes included in the compute node pool may be black, nodes included in the infrastructure pool may be white, and nodes included in the storage node pool may have diagonal lines. Each node pool may have a defined set of duties, tasks, or services that can be assigned to the node pool. It may be that a node pool cannot be assigned duties, tasks, or services that are not included in the defined set of duties, tasks, or services of that node pool. There may be overlap among the defined sets of duties, tasks, or services of each node pool. In the alternative, there may not be any overlap among the defined sets of duties, tasks, or services of each node pool. The compute node pool may have a first defined set of duties that includes hosting customer workloads and running customer workloads. The first defined set of duties may not include providing auxiliary services that support functioning of the edge zone 310 or proper functioning of virtual machines hosted on the edge zone 310. The infrastructure node pool may have a second defined set of duties that includes providing auxiliary services that support functioning of the edge zone 310 and proper functioning of virtual machines hosted on the edge zone 310. The second defined set of duties may not include hosting customer workloads or running customer workloads. Although FIGS. 3A-3C illustrates the nodes 336 allocated among the compute node pool, the infrastructure node pool, and the storage node pool, other designs may have node pools different in type, scope, and number.

FIG. 3A may illustrate the edge zone 310 at a time to. The time $t_0$ may be any point in time of a life cycle of the edge zone 310. For example, the time $t_0$ may be at an initial configuration of the edge zone 310. In the alternative, the time to may be a period of time after the initial configuration of the edge zone 310.

At the time $t_0$, the nodes 336 may have a first allocation among the compute node pool, the infrastructure node pool, and the storage node pool. At the time to, the compute node pool may include the node 336*a*-1, the node 336*a*-2, the node 336*a*-3, the node 336*a*-5, the node 336*a*-6, the node 336*a*-7, the node 336*a*-8, the node 336*b*-2, the node 336*b*-3, the node 336*b*-5, the node 336*b*-6, the node 336*b*-7, the node 336*b*-8, the node 336*b*-9, and the node 336*b*-10. At the time $t_0$, the infrastructure node pool may include the node 336*a*-4, the node 336*a*-9, the node 336*a*-10, the node 336*b*-1, the node 336*b*-4, the node 336*c*-3, and the node 336*c*-4. At the time to, the storage node pool may include the node 336*c*-1, the node 336*c*-2, the node 336*c*-5, the node 336*c*-6, the node 336*c*-7, the node 336*c*-8, the node 336*c*-9, and the node 336*c*-10.

At the time $t_0$, the infrastructure monitor may receive usage information from nodes in the infrastructure node pool (i.e., the node 336*a*-4, the node 336*a*-9, the node 336*a*-10, the node 336*b*-1, the node 336*b*-4, the node 336*c*-3, and the node 336*c*-4). The usage information may indicate utilization of the nodes in the infrastructure node pool. The usage information may indicate a percentage of resources of the infrastructure node pool being utilized for providing services assigned to the infrastructure node pool. The infrastructure node monitor may receive usage information from each of the nodes in the infrastructure node pool or may receive aggregated usage information for the entire infrastructure node pool. The usage information may be only for healthy nodes in the infrastructure node pool. For example, assume the usage information indicates that the infrastructure node pool is operating at 80% capacity. That may mean that the healthy nodes in the infrastructure node pool are operating at 80% capacity. In the alternative, the usage information may assume that all nodes in the infrastructure node pool can provide services, including any unhealthy or non-functioning nodes. For example, assume the usage information indicates that the infrastructure node pool is operating at 80% capacity. Also assume that one of the nodes in the infrastructure pool is unhealthy. In that case, the healthy nodes in the infrastructure pool may in fact be operating at greater than 80% capacity because the unhealthy node may not be providing services.

At the time $t_0$, the node monitor may receive health information from the nodes 336. The health information may indicate a health of the nodes 336 or a health of resources of the nodes 336. The health information may indicate an ability of the nodes 336 to provide services. The health information may indicate a current operating capacity of each of the nodes 336 as compared to a designed operating capacity of each of the nodes 336. The node monitor may receive health information from each of the nodes 336 or may receive aggregated health information. The health information may indicate an ability of each node to perform services.

At the time $t_0$, the machine pool manager may receive the usage information from the infrastructure monitor and the health information from the node monitor. The machine pool manager may analyze the usage information and the health information to determine whether to reallocate nodes between the compute node pool and the infrastructure node pool. The machine pool manager may use one or more rules to determine whether to reallocate nodes between the compute node pool and the infrastructure node pool. The one or more rules may include a predetermined maximum threshold, a predetermined minimum threshold, a predetermined overutilization time period, and a predetermined underutilization time period.

The predetermined maximum threshold may be a maximum utilization percentage or a maximum percentage of capacity of the infrastructure node pool. The machine pool manager may use the predetermined maximum threshold in determining whether to re-provision a node from the compute node pool to the infrastructure node pool. The machine pool manager may determine that a node should be re-provisioned from the compute node pool to the infrastructure node pool if the infrastructure node pool is operating at or above the predetermined maximum threshold. For example, a predetermined maximum threshold may be 75% and the machine pool manager may determine that a node should be re-provisioned from a compute node pool to an infrastructure node pool if the infrastructure node pool is operating at or above 75% of capacity.

The predetermined maximum threshold may be a maximum utilization percentage of current and available capacity or a maximum percentage of current and available capacity of the infrastructure node pool. The predetermined maximum threshold may be a maximum utilization percentage of healthy resources or healthy nodes in the infrastructure node pool. The predetermined maximum threshold may be applied based on a current operating capacity of the infrastructure node pool. In determining whether the infrastructure node pool is operating at or above the predetermined maximum threshold, the machine pool manager may use health information received from nodes in the infrastructure node pool to determine a current operating capacity of the infrastructure node pool. The machine pool manager may use usage information received from the nodes in the infrastructure node pool to determine whether the infrastructure node pool is operating at or above the predetermined maximum threshold of the current operating capacity of the infrastructure node pool. For example, a predetermined maximum threshold may be 80%. The machine pool manager may determine that a node should be re-provisioned from a compute node pool to an infrastructure node pool if the infrastructure node pool is operating at or above 80% of a current operating capacity of the infrastructure node pool.

The current operating capacity of the infrastructure node pool may be less than an original or designed operating capacity of the infrastructure node pool if the infrastructure node pool includes unhealthy nodes or unhealthy resources.

The predetermined minimum threshold may be a minimum utilization percentage or a minimum percentage of capacity of the infrastructure node pool. The machine pool manager may use the predetermined minimum threshold in determining whether to re-provision a node from the infrastructure node pool to the compute node pool. The machine pool manager may determine that a node should be re-provisioned from the infrastructure node pool to the compute node pool if the infrastructure node pool is operating at or below the predetermined minimum threshold. For example, a predetermined minimum threshold may be 30%. The machine pool manager may determine that a node should be re-provisioned from a compute node pool to an infrastructure node pool if the infrastructure node pool is operating at or below 30% of capacity.

The predetermined minimum threshold may be a minimum utilization percentage of current and available capacity or a minimum percentage of current and available capacity of the infrastructure node pool. The predetermined minimum threshold may be a minimum utilization percentage of healthy resources or healthy nodes in the infrastructure node pool. The predetermined minimum threshold may be applied based on a current operating capacity of the infrastructure node pool. In determining whether the infrastructure node pool is operating at or below the predetermined minimum threshold, the machine pool manager may use health information received from nodes in the infrastructure node pool to determine a current operating capacity of the infrastructure node pool. The machine pool manager may use usage information received from the nodes in the infrastructure node pool to determine whether the infrastructure node pool is operating at or below the predetermined minimum threshold of the current operating capacity of the infrastructure node pool. For example, a predetermined minimum threshold may be 30%. The machine pool manager may determine that a node should be re-provisioned from an infrastructure node pool to a compute node pool if the infrastructure node pool is operating at or below 30% of a current operating capacity of the infrastructure node pool.

The predetermined overutilization time period may be a defined period of time. The machine pool manager may use the predetermined overutilization time period in determining whether to re-provision a node from the compute node pool to the infrastructure node pool. The machine pool manager may determine that a node should be re-provisioned from the compute node pool to the infrastructure node pool if the infrastructure node pool is operating at or above the predetermined maximum threshold for the predetermined overutilization time period.

The predetermined underutilization time period may be a defined period of time. The machine pool manager may use the predetermined underutilization time period in determining whether to re-provision a node from the infrastructure node pool to the compute node pool. The machine pool manager may determine that a node should be re-provisioned from the infrastructure node pool to the compute node pool if the infrastructure node pool is operating at or below the predetermined minimum threshold for the predetermined underutilization time period.

At the time $t_0$, the machine pool manager may receive execution information. The execution information may include information regarding virtual machines and workloads running on each node in the compute node pool. The execution information may indicate a number of virtual machines and workloads, a size of virtual machines and workloads, an amount or percentage of resources being used to execute workloads, an amount of resources dedicated to virtual machines and workloads, an amount of time remaining to complete workloads, and a priority of workloads.

The machine pool manager may analyze the execution information and the health information in selecting a node to re-provision between the infrastructure node pool and the compute node pool. The machine pool manager may select the node to re-provision using one or more selection rules. For re-provisioning a compute node to an infrastructure node, the one or more selection rules may prioritize selecting a node that, among nodes in the compute node pool, is hosting a fewest number of workloads, hosting a smallest size of workloads, executing a lowest priority of workloads, operating at a lowest capacity, dedicating a smallest amount of resources to executing workloads, or dedicating a smallest amount of resources to virtual machines or workloads. For re-provisioning an infrastructure node to a compute node, the one or more selection rules may prioritize selecting a node that, among nodes in the infrastructure node pool, is operating at a lowest capacity, hosting a least important set of services, or dedicating a smallest amount of resources to providing services.

For example purposes, assume that the time to is a time after the edge zone 310 has been operating for a non-zero amount of time. Assume that the machine pool manager includes a first rule for determining whether to reallocate a node from the compute node pool to the infrastructure node pool. Assume the first rule provides that the machine pool manager re-provisions a compute node to be an infrastructure node when the infrastructure node pool has been operating at or above a predetermined maximum threshold for a predetermined overutilization time period. Assume the predetermined maximum threshold is 80% of current capacity (considering a health status of nodes in the infrastructure node pool) and that the predetermined overutilization period is 10 minutes. Assume the machine pool manager receives health information indicating that the node **336*a*-10 is unhealthy and unavailable to provide services. Assume the machine pool manager receives usage information indicating that the node 336*a*-4 is operating at 80% capacity, the node 336*a*-9 is operating at 85% capacity, the node 336*b*-1 is operating at 75% capacity, the node 336*b*-4 is operating at 90% capacity, the node 336*c*-3 is operating at 70% capacity, and the node 336*c*-4 is operating at 80% capacity. Assume that the machine pool manager has been receiving usage information indicating that those nodes have been operating at those capacities for the predetermined overutilization period. Assume the node 336*a*-4, the node 336*a*-9, the node 336*b*-1, the node 336*b*-4, the node 336*c*-3, and the node 336*c*-4** have identical current capacities. The machine pool manager may determine, based on the health information and the usage information, that the first rule is satisfied.

Assume the machine pool manager includes a second rule for selecting a compute node to re-provision to the infrastructure node pool. Assume the second rule provides that a compute node with a lowest number of workloads should be re-provisioned. Assume the machine pool manager receives execution information indicating that the node **336*a*-1 is running three workloads, the node 336*a*-2 is running ten workloads, the node 336*a*-3 is running two workloads, the node 336*a*-5 is running five workloads, the node 336*a*-6 is running five workloads, the node 336*a*-7 is running three workloads, the node 336*a*-8 is running three workloads, the node 336*b*-2 is running six workloads, the node 336*b*-3 is running three workloads, the node 336*b*-5 is running six workloads, the node 336*b*-6 is running four workloads, the node 336*b*-7 is running three workloads, the node 336*b*-8 is running five workloads, the node 336*b*-9 is running four workloads, and the node 336*b*-10 is running six workloads. Based on the execution information and the second rule, the machine pool manager may select the node 336*a*-3 to move from the compute node pool to the infrastructure node pool. The machine pool manager may instruct the node manager to move the node 336*a*-3 from the compute node pool to the infrastructure node pool and migrate two workloads currently running on the node 336*a*-3 to one or more of the node 336*a*-1, the node 336*a*-2, the node 336*a*-5, the node 336*a*-6, the node 336*a*-7, the node 336*a*-8, the node 336*b*-2, the node 336*b*-3, the node 336*b*-5, the node 336*b*-6, the node 336*b*-7, the node 336*b*-8, the node 336*b*-9, or the node 336*b*-10**.

FIG. 3B may illustrate the edge zone 310 at a time $t_1$. The time $t_1$ may be after the time $t_0$. The allocation of the nodes 336 among the compute node pool, the infrastructure node pool, and the storage node pool may be identical to the allocation at the time to except that the node **336*a*-3** may have been re-provisioned from the compute node pool to the infrastructure node pool.

For example purposes, assume that the machine pool manager includes a third rule for determining whether to reallocate a node from the infrastructure node pool to the compute node pool. Assume the third rule provides that the machine pool manager re-provisions an infrastructure node to the compute node pool when the infrastructure node pool has been operating at or below a predetermined minimum threshold for a predetermined underutilization time period. Assume the predetermined minimum threshold is 30% of current capacity and that the predetermined underutilization period is 10 minutes. Assume the machine pool manager receives health information indicating that all nodes in the infrastructure node pool are healthy (which may mean resources of the node **336*a*-10 have been repaired or replaced). Assume the machine pool manager receives usage information indicating that the node 336*a*-3 is operating at 10% capacity, the node 336*a*-4 is operating at 50% capacity, the node 336*a*-9 is operating at 20% capacity, the node 336*a*-10 is operating at 20% capacity, the node 336*b*-1 is operating at 30% capacity, the node 336*b*-4 is operating at 10% capacity, the node 336*c*-3 is operating at 30% capacity, and the node 336*c*-4 is operating at 5% capacity. Assume the machine pool manager has been receiving usage information indicating that those nodes have been operating at those capacities for the predetermined underutilization period. Assume that the node 336*a*-3, the node 336*a*-4, the node 336*a*-9, the node 336*a*-10, the node 336*b*-1, the node 336*b*-4, the node 336*c*-3, and the node 336*c*-4** all have a same current capacity. The machine pool manager may determine, based on the health information and the usage information, that the third rule is satisfied.

Assume the machine pool manager includes a fourth rule for selecting an infrastructure node to re-provision to the compute node pool. Assume the fourth rule provides that an infrastructure node operating at a lowest capacity should be re-provisioned. Assume the fourth rule also provides that infrastructure nodes in the rack **334*c* (the node 336*c*-3 and the node 336*c*-4) may not be re-provisioned. Based on the usage information and the fourth rule, the machine pool manager may select either the node 336*a*-3 or the node 336*b*-4 to move from the infrastructure node pool to the compute node pool. The machine pool manager may instruct the node manager to re-provision the node 336*b*-4** to the compute node pool.

FIG. 3C may illustrate the edge zone 310 at a time $t_2$. The time $t_2$ may be after the time $t_1$. The allocation of the nodes 336 among the compute node pool, the infrastructure node pool, and the storage node pool may be identical to the allocation at time $t_1$ except that the node **336*b*-4** may have been re-provisioned from the infrastructure node pool to the compute node pool.

Figure 4:
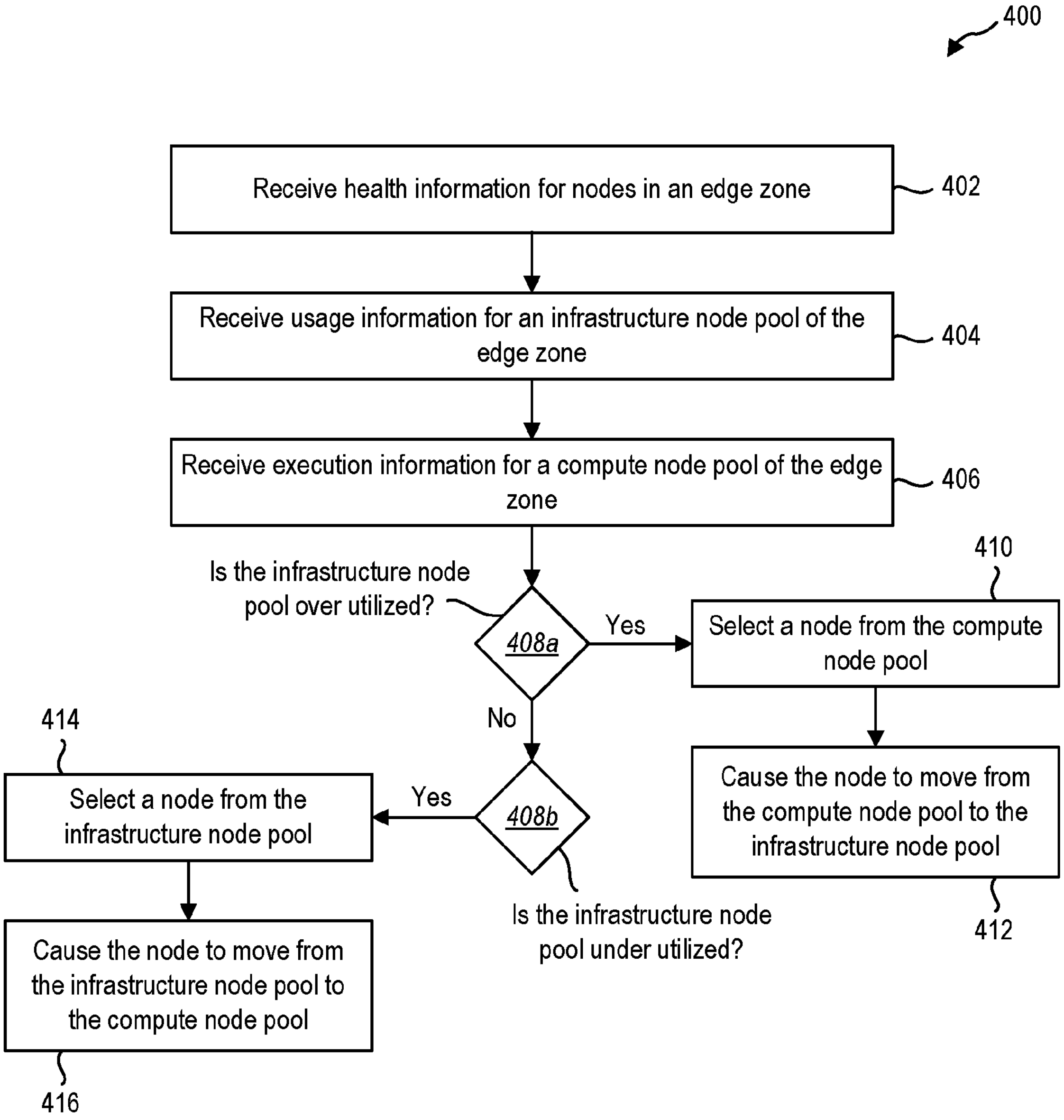
FIG. 4 illustrates an example method for dynamically re-allocating nodes between a compute node pool and an infrastructure node pool.

FIG. 4 illustrates an example method 400 for dynamically allocating nodes between node pools of an edge zone.

The method 400 may include receiving 402 health information for nodes in an edge zone. The health information may indicate a health status of the nodes and resources of the nodes. The health information may indicate a current operating capacity of the nodes.

The method 400 may include receiving 404 usage information for an infrastructure node pool of the edge zone. The usage information may indicate a utilization of resources and nodes in the infrastructure node pool. The resources and the nodes in the infrastructure node pool may be assigned to perform only services included in a predefined set of services associated with the infrastructure node pool.

The method 400 may include receiving 406 execution information for a compute node pool of the edge zone. The execution information may indicate a utilization of resources and nodes in the compute node pool. The execution information may indicate a presence of workloads and virtual machines on nodes in the compute node pool. The resources and the nodes in the compute node pool may be assigned to perform only services included in a predefined set of services associated with the compute node pool.

The method 400 may include determining **408*a* whether the infrastructure node pool is over utilized. Determining 408*a* whether the infrastructure node is over utilized may be based on the health information and the usage information. Determining 408*a*** whether the infrastructure node pool is over utilized may include applying one or more rules to the health information and the usage information. The one or more rules may include a predetermined maximum threshold and a predetermined overutilization period.

If the infrastructure node pool is over utilized, the method 400 may include selecting 410 a node from the compute node pool and causing 412 the node to move from the compute node pool to the infrastructure node pool. Selecting 410 the node may include selecting the node based on the execution information and the health information. Selecting 410 the node may include applying one or more selection rules to the execution information and the health information. The one or more selection rules may prioritize selecting a node among nodes in the compute node pool that is executing a fewest number of workloads or hosting a smallest number of virtual machines. The one or more selection rules may prioritize selecting a node that is healthy or that has a threshold percentage of healthy resources.

The method 400 may include determining **408*b* whether the infrastructure node pool is under utilized. Determining 408*b* whether the infrastructure node is under utilized may be based on the health information and the usage information. Determining 408*b*** whether the infrastructure node pool is under utilized may include applying one or more rules to the health information and the usage information. The one or more rules may include a predetermined minimum threshold and a predetermined underutilization period.

If the infrastructure node pool is under utilized, the method 400 may include selecting 414 a node from the infrastructure node pool and causing 416 the node to move from the infrastructure node pool to the compute node pool. Selecting 414 the node may include selecting the node based on the usage information and the health information. Selecting 410 the node may include applying one or more selection rules to the usage information. The one or more selection rules may prioritize selecting a node among nodes in the infrastructure node pool that is utilizing a smallest amount of resources. The one or more selection rules may prioritize selecting a node that is healthy or that has a threshold percentage of healthy resources.

Figure 5:
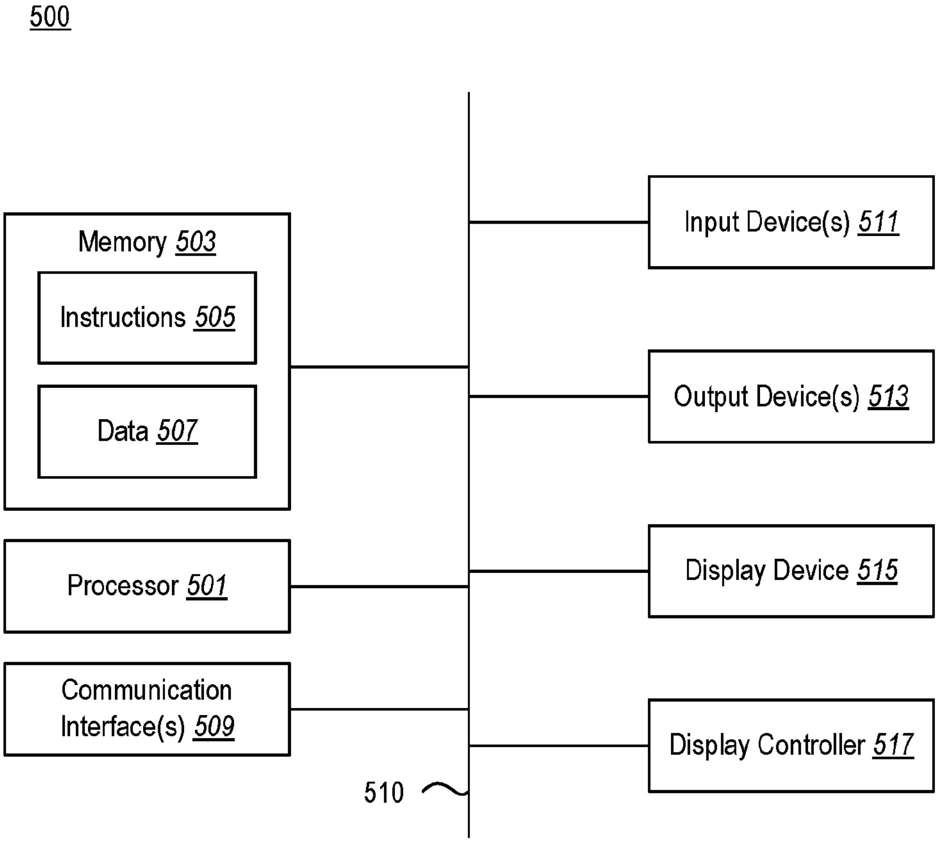
FIG. 5 illustrates certain components that can be included within a computing device.

Reference is now made to FIG. 5. One or more computing devices 500 can be used to implement at least some aspects of the techniques disclosed herein. FIG. 5 illustrates certain components that can be included within a computing device 500.

The computing device 500 includes a processor 501 and memory 503 in electronic communication with the processor 501. Instructions 505 and data 507 can be stored in the memory 503. The instructions 505 can be executable by the processor 501 to implement some or all of the methods, steps, operations, actions, or other functionality that is disclosed herein. Executing the instructions 505 can involve the use of the data 507 that is stored in the memory 503. Unless otherwise specified, any of the various examples of modules and components described herein can be implemented, partially or wholly, as instructions 505 stored in memory 503 and executed by the processor 501. Any of the various examples of data described herein can be among the data 507 that is stored in memory 503 and used during execution of the instructions 505 by the processor 501.

Although just a single processor 501 is shown in the computing device 500 of FIG. 5, in an alternative configuration, a combination of processors (e.g., an Advanced RISC (Reduced Instruction Set Computer) Machine (ARM) and a digital signal processor (DSP)) could be used.

The computing device 500 can also include one or more communication interfaces 509 for communicating with other electronic devices. The communication interface(s) 509 can be based on wired communication technology, wireless communication technology, or both. Some examples of communication interfaces 509 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

The computing device 500 can also include one or more input devices 511 and one or more output devices 513. Some examples of input devices 511 include a keyboard, mouse, microphone, remote control device, button, joystick, trackball, touchpad, and lightpen. One specific type of output device 513 that is typically included in a computing device 500 is a display device 515. Display devices 515 used with embodiments disclosed herein can utilize any suitable image projection technology, such as liquid crystal display (LCD), light-emitting diode (LED), gas plasma, electroluminescence, wearable display, or the like. A display controller 517 can also be provided, for converting data 507 stored in the memory 503 into text, graphics, and/or moving images (as appropriate) shown on the display device 515. The computing device 500 can also include other types of output devices 513, such as a speaker, a printer, etc.

The various components of the computing device 500 can be coupled together by one or more buses, which can include a power bus, a control signal bus, a status signal bus, a data bus, etc. For the sake of clarity, the various buses are illustrated in FIG. 5 as a bus system 510.

The techniques disclosed herein can be implemented in hardware, software, firmware, or any combination thereof, unless specifically described as being implemented in a specific manner. Any features described as modules, components, or the like can also be implemented together in an integrated logic device or separately as discrete but interoperable logic devices. If implemented in software, the techniques can be realized at least in part by a non-transitory computer-readable medium having computer-executable instructions stored thereon that, when executed by at least one processor, perform some or all of the steps, operations, actions, or other functionality disclosed herein. The instructions can be organized into routines, programs, objects, components, data structures, etc., which can perform particular tasks and/or implement particular data types, and which can be combined or distributed as desired in various embodiments.

The term "processor" can refer to a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, or the like. A processor can be a central processing unit (CPU). In some embodiments, a combination of processors (e.g., an ARM and DSP) could be used to implement some or all of the techniques disclosed herein.

The term "memory" can refer to any electronic component capable of storing electronic information. For example, memory may be embodied as random access memory (RAM), read-only memory (ROM), magnetic disk storage media, optical storage media, flash memory devices in RAM, various types of storage class memory, on-board memory included with a processor, erasable programmable read-only memory (EPROM), electrically erasable programmable read-only memory (EEPROM) memory, registers, and so forth, including combinations thereof.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" (and grammatical variants thereof) can encompass a wide variety of actions. For example, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there can be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

The invention claimed is:

1. A cloud-computing system that provides services to a client, the cloud-computing system comprising:

a data center comprising a first set of nodes, wherein the data center has a first geographic location different from a second geographic location of the client;

an edge zone comprising a second set of nodes, wherein the edge zone has a third geographic location, wherein the second geographic location is more proximate to the third geographic location than to the first geographic location, wherein the first set of nodes are greater in number than the second set of nodes, and wherein the second set of nodes comprises:

a first pool of nodes for performing workloads of the client; and a second pool of nodes for providing services other than performing the workloads of the client; and a node pool manager that receives health information for the first pool of nodes and the second pool of nodes and usage information for the second pool of nodes, determines, based on the health information and the usage information, a best node located at the edge that is executing a smallest amount of workloads to re-provision a node between the first pool of nodes and the second pool of nodes, and causes the best node to be re-provisioned based on the determination, wherein the second pool of nodes provides auxiliary services that support proper functioning of the edge zone or proper functioning of virtual machines hosted on the edge zone.

2. The cloud-computing system of claim 1, wherein the health information indicates a health of resources of the second pool of nodes, the usage information indicates an amount of utilization of the second pool of nodes, and the node pool manager determines to re-provision the node between the first pool of nodes and the second pool of nodes if the second pool of nodes is over utilized or under utilized.

3. The cloud-computing system of claim 1, wherein the node pool manager includes a maximum threshold and the node pool manager determines to re-provision the node from the first pool of nodes to the second pool of nodes if the second pool of nodes is operating at or above the maximum threshold.

4. The cloud-computing system of claim 3, wherein the node pool manager determines whether the second pool of nodes is operating at or above the maximum threshold based on a current operating capacity of the second pool of nodes.

5. The cloud-computing system of claim 1, wherein the node pool manager includes a maximum threshold and an overutilization time period and the node pool manager determines to re-provision the node from the first pool of nodes to the second pool of nodes if the second pool of nodes has been operating at or above the maximum threshold for the overutilization time period.

6. The cloud-computing system of claim 1, wherein the node pool manager includes a minimum threshold and the node pool manager determines to re-provision the node from the second pool of nodes to the first pool of nodes if the second pool of nodes is operating at or below the minimum threshold.

7. The cloud-computing system of claim 1, wherein the node pool manager includes a minimum threshold and an underutilization time period and the node pool manager determines to re-provision the node from the second pool of nodes to the first pool of nodes if the second pool of nodes has been operating at or below the minimum threshold for the underutilization time period.

8. The cloud-computing system of claim 1, wherein the node pool manager is located in the data center.

9. The cloud-computing system of claim 1, wherein the second set of nodes comprises a third pool of nodes for providing storage services.

10. The cloud-computing system of claim 1, wherein a latency of the client interacting with the workloads of the client on the edge zone is less than a latency of the client interacting with other workloads of the client on the data center.

11. A method for re-allocating nodes between a first node pool and a second node pool of an edge zone, wherein the edge zone is part of a cloud-computing system, is managed by a data center of the cloud-computing system, and has a geographic location different from the data center, the method comprising:

receiving health information for the first node pool and the second node pool, wherein the first node pool executes workloads for a client and the second node pool provides services other than executing the workloads for the client;

receiving usage information for the second node pool;

determining, based on the health information and the usage information, to modify an allocation of nodes between the first node pool and the second node pool, wherein modifying the allocation of the nodes between the first node pool and the second node pool comprises re-assigning a node from the first node pool to the second node pool or re-assigning a node from the second node pool to the first node pool;

selecting a best node located at the edge that is executing a smallest amount of workloads to re-assign based on the determination; and causing modification of the allocation of the nodes between the first node pool and the second node pool by re-assigning the best node, wherein the second node pool provides auxiliary services that support proper functioning of the edge zone or proper functioning of virtual machines hosted on the edge zone.

12. The method of claim 11, wherein determining to modify the allocation of nodes between the first node pool and the second node pool is further based on determining that the second node pool is over utilized or under utilized.

13. The method according to claim 11, further comprising:

determining, based on the health information and the usage information, to re-provision a selected node from the first node pool to the second node pool; and causing re-provisioning of the selected node from the first node pool to the second node pool.

14. The method according to claim 13 further comprising:

receiving execution information for the first node pool; and selecting for re-provisioning, based on the health information and the execution information, the selected node from the first node pool.

15. The method according to claim 13, wherein selecting the selected node from the first node pool comprises determining whether the selected node is executing any of the workloads for the client.

16. The method according to claim 13, wherein selecting the selected node from the first node pool comprises determining whether the node is executing a fewest number of the workloads for the client as compared to other nodes in the first node pool.

17. The method according to claim 13, further comprising migrating any workloads executing on the selected node to one or more other nodes in the first node pool.

18. A non-transitory computer-readable medium comprising instructions that are executable by one or more processors to cause a computing system to:

receive health information for infrastructure nodes included in an edge zone, wherein the edge zone is part of a cloud-computing system, the cloud-computing system includes a data center separate from the edge zone, and the edge zone is more proximate to a client than the data center;

receive usage information for the infrastructure nodes;

determine, based on the health information and the usage information, that the infrastructure nodes have been operating above a maximum percentage of capacity for an overutilization time period;

cause, based on the determination that the infrastructure nodes have been operating above the maximum percentage of capacity for the overutilization time period, an infrastructure node of the infrastructure nodes to be re-provisioned as a compute node;

determine, based on the health information and the usage information, that the infrastructure nodes have been operating below a minimum percentage of capacity for an underutilization time period; and cause, based on the determination that the infrastructure nodes have been operating below the minimum percentage of capacity for the underutilization time period, a node of the edge zone to be added to the infrastructure nodes.

19. The non-transitory computer-readable medium of claim 18 further comprising instructions that are executable by one or more processors to cause the computing system to:

determine, based on the health information and the usage information, that the infrastructure node is a best node from among the infrastructure nodes for re-provisioning.

20. The non-transitory computer-readable medium of claim 18 further comprising instructions that are executable by one or more processors to cause the computing system to:

migrate services running on the infrastructure node to one or more other nodes of the infrastructure nodes.

* * * * *